United States Patent Office 3,448,119
Patented June 3, 1969

3,448,119
PRODUCING TETRAMETHYLISOINDOLENINE BY HEATING ACETONYLACETONE IN AQUEOUS AMMONIUM SALT
Henry Fletcher, Moston, Manchester, England, assignor, by mesne assignments, to Wallace & Tiernan Inc., East Orange, N.J., a corporation of Delaware
No Drawing. Original application Nov. 16, 1964, Ser. No. 411,597, now Patent No. 3,322,785, dated May 30, 1967. Divided and this application Jan. 20, 1967, Ser. No. 627,575
Claims priority, application Great Britain, Nov. 19, 1963, 45,548/63, 45,549/63, 45,550/63
Int. Cl. C07d 27/56
U.S. Cl. 260—326.1                              2 Claims

ABSTRACT OF THE DISCLOSURE 1,3,4,7-tetramethylisoindolenine, and salts thereof with acids are produced by reacting acetonylacetone with an ammonium salt, the pH of a molar solution of which is less than 7.0, the reaction being carried out substantially in the absence of molecular oxygen.

---

This application is a divisional of U.S. Ser. No. 411,597, filed Nov. 16, 1964, now U.S. Pat. No. 3,322,785.

The present invention relates to the production of heterocyclic organic compounds and in particular to substituted isoindolenines and their production.

According to the invention, 1,3,4,7-tetramethylisoindolenine, and salts thereof with acids are produced by reacting acetonylacetone with an ammonium salt, the pH of a molar solution of which is less than 7.0, the reaction being carried out substantially in the absence of molecular oxygen.

The salt of the 1,3,4,7-tetramethylisoindolenine may for example be a salt of sulphuric acid, phosphoric acid, hydrochloric or other hydrohalic acid, nitric acid, thiocyanic acid, inorganic acid, or of acetic or other monocarboxylic acid, picric acid, or other organic acid. These salts are generally directly produced by the process of this aspect of the present invention, but they can also be produced from the corresponding free base and the corresponding acid to produce the desired salt.

The ammonium salt with which the gamma-diketone is reacted is a salt, the pH of a molar solution of which is less than 7.0 and preferably less than 5.5. Ammonium sulphate, ammonium chloride, ammonium thiocyanate and ammonium nitrate are examples of such salts, the pH of a molar solution of which is less than 7.0. If ammonium phosphate or ammonium acetate is reacted with the acetonylacetone, the desired 1,3,4,7-tetramethylisoindolenine of the invention is not produced in significant yields.

In this invention, the ammonium salt is conveniently in the form of an aqueous solution. The reaction is carried out by heating acetonylacetone with an aqueous solution of the ammonium salt, for example by boiling acetonylacetone and the solution of the ammonium salt together under reflux conditions. Preferably the reaction is carried out with an excess of the ammonium salt over the stoichiometric proportion of acetonylacetone.

The reaction may be carried out substantially in the absence of molecular oxygen by operating in an atmosphere of nitrogen or other inert gas. When carried out on a small scale, the process may be conveniently conducted in a gloved box in which the air present has been replaced by nitrogen or other inert gas. On a larger scale, the apparatus in which the process is carried out can be freed from air by flushing out with the inert gas and maintaining an atmosphere of inert gas during the production and recovery of the desired product, conveniently at a slightly superatmospheric pressure to obviate leakage of atmospheric oxygen into the apparatus.

The product of the reaction may also comprise a salt of 1,3,4,7-tetramethylisoindolenine with an acid and, if the free base or a salt of the base with another acid is desired, the free 1,3,4,7-tetramethylisoindolenine is obtained from the product by treating the product with alkali, for example by addition of an aqueous solution of an alkali metal hydroxide, carbonate or bicarbonate. The alkali used is a stronger base than the organic base to be liberated from the salt.

The product may be washed and dried, or further purified, and isolated by per se conventional methods, taking care to exclude contacting free substituted isoindolenine base with molecular oxygen. Alternatively to the isolation of the free 1,3,4,7-tetramethylisoindolenine base, the free base comprised in the product of the reaction may be converted to a desired salt of another inorganic or organic acid, by per se conventional procedures, taking care to exclude molecular oxygen.

The following examples further illustrate the present invention. Parts by weight shown therein bear the same relationship to parts by volume as do kilograms to liters. Percentages are expressed by weight unless otherwise stated.

Example 1

45.2 parts by weight of acetonylacetone, 89.8 parts by weight of ammonium sulphate and 800 parts by volume of water were refluxed for 18 hours in an atmosphere of nitrogen. The resulting solution contained 1,3,4,7-tetramethylisoindolenine sulphate, which could be recovered and isolated if desired.

150 parts by volume of a 20% aqueous solution of sodium hydroxide were then added, also under a nitrogen atmosphere. The resulting precipitate was collected by filtration, washed with distilled water until free from alkali, and then dried.

The 1,3,4,7-tetramethylisoindolenine thus produced amounted to 27.9 parts by weight, representing a yield of 81.4% theoretical. The compound was crystallized from 160 parts by volume of diisopropyl ether to give 12.7 parts by weight of yellow, needle-shaped crystals, having melting point 144° to 146° C. A further crop of 10.0 parts by weight of 1,3,4,7-tetramethylisoindolenine having melting point of 144° to 146° C., was recovered from the mother liquor, the total 22.7 parts by weight of the purified compound representing a yield of 66.2% theoretical.

Example 2

11.2 parts by weight of acetonylacetone, 9 parts by weight of ammonium chloride and 200 parts by volume of water were refluxed for 18 hours in an atmosphere of nitrogen. The resulting solution contained 1,3,4,7-tetramethylisoindolenine chloride, which could be recovered and isolated if desired.

The addition of aqueous sodium hydroxide solution to this solution resulted in precipitating free 1,3,4,7-tetramethylisoindolenine, which was collected by filtration, washed with water until the washings were free from alkali and then dried.

The product was crystallized from diisopropyl ether to give 1,3,4,7-tetramethylisoindolenine having melting point 143° to 144° C.

Example 3

The procedure described in Example 2 was carried out using 13.6 parts by weight of ammonium nitrate instead of the ammonium chloride. The resulting solution contained 1,3,4,7-tetramethylisoindolenine nitrate, which could be recovered and isolated if desired.

The product, on crystallization from diisopropyl ether, was 1,3,4,7-tetramethylisoindolenine having melting point 143° to 144° C.

Example 4

The procedure described in Example 3 was carried out using 13 parts by weight of ammonium thiocyanate instead of the ammonium chloride. The resulting solution contained 1,3,4,7-tetramethylisoindolenine thiocyanate, which could be recovered and isolated if desired.

The product, on crystallization from diisopropyl ether, was 1,3,4,7-tetramethylisoindolenine having melting point 143° to 144° C.

The oxygen-scavenging properties of the substituted isoindolenines of the present invention, are illustrated, for instance, by the following Examples carried out with 1,3,4,7-tetramethylisoindolenine and its salts.

Example A

The test solution was produced by heating together, under reflux conditions, 22.6 parts by weight of acetonylacetone and 49.9 parts by weight of ammonium sulphate in 400 parts by volume of water. The solution produced consisted essentially of 1,3,4,7-tetramethylisoindolenine sulphate.

Samples, each of 250 milliliters, of neutral water initially containing 1.6 parts per million of oxygen were mixed with the quantities of the 1,3,4,7-tetramethylisoindolenine sulphate solution specified in Table I under Winkler test conditions. The results of the tests are also given in the table.

TABLE I

| Quantity of solution added (milliliters) | Oxygen content of treated solution (p.p.m.) |
|---|---|
| 1 | 0.52 |
| 5 | Nil |
| 10 | Nil |
| 25 | Nil |

A nil result in the second column signifies in immeasurably low proportion of oxygen present in the water. The results demonstrate the effectiveness of 1,3,4,7-tetramethylisoindolenine sulphate as an oxygen-scavenging agent.

Example B

The procedure described in Example A was carried out using samples, eac hof 280 milliliters of neutral water initially containing 2.6 parts per million of oxygen. The samples were left for 3 days at 21° C. in admixture with the specified amounts of the 1,3,4,7-tetramethylisoindolenine sulphate solution under Winkler test conditions.

The results of the tests are given in Table II, in which a nil result in the second column signifies an immeasurably low proportion of oxygen.

TABLE II

| Quantity of solution added (milliliters) | Oxygen content of treated solution (p.p.m.) |
|---|---|
| 0.5 | 0.55 |
| 1 | Nil |
| 2 | Nil |

The results again demonstrate the effectiveness of 1,3,4,7-tetramethylisoindolenine sulphate as an over scavenging agent.

Example C

A solution of 1,3,4,7-tetramethylisoindolenine sulphate, prepared as described in Example A, was admixed with solium hydroxide to raise the pH value of the aqueous mixture to the values stated in Table III. The resulting solutions thus consisted essentially of free 1,3,4,7-tetramethylisoindolenine.

Samples, each of 280 milliliters, of water initially containing 7.12 parts per million of oxygen were treated under Winkler test conditions by the procedure described in Example B. The results are given in Table III, in which a nil result in the third column signifies an immeasurably low proportion of oxygen.

TABLE III

| Quantity of solution added (milliliters) | pH value of solution | Oxygen content of treated solution (p.p.m.) |
|---|---|---|
| 1 | 4.6 | Nil |
| 0.5 | 12.0 | 0.8 |
| 1 | 12.0 | Nil |
| 2 | 12.0 | Nil |

These results demonstrate the effectiveness of 1,3,4,7-tetramethylisoindolenine as an oxygen-scavenging agent.

If, instead of using the specific compounds as described in Examples A to C, other substituted isoindolenines of this invention or their salts are used in the tests, similar results are obtained to demonstrate the oxygen-scavenging properties.

While production of the compound A and salts thereof has been disclosed and is hereinafter claimed in terms of isoindolenine with four methyl R-substituents it is recognized that by virtue of its structure, it can also exist in the tetramethyl-substituted tautomeric form B, as follows:

$$\underset{A}{\underset{R^1 \quad R^4}{\text{[structure with } R^2, R^3, N\text{]}}} \rightleftarrows \underset{B}{\underset{R^1 \quad R^4}{\text{[structure with } R^2, R^3, NH\text{]}}}$$

What is claimed is:

1. A process of producing a member selected from the group consisting of 1,3,4,7-tetramethylisoindolenines and salts thereof with acids, which comprises heating acetonylacetone with an aqueous solution of a salt selected from the group consisting of ammonium sulfate, ammonium chloride, ammonium thiocyanate and ammonium nitrate, the pH of a molar solution of which is less than 7.0, substantially in the absence of molecular oxygen.

2. A process according to claim 1 wherein the ammonium salt is a salt, the pH of a molar solution of which is less than 5.5.

References Cited

UNITED STATES PATENTS 3,007,939   11/1961   Norton ———————— 260—326.1

NICHOLAS S. RIZZO, *Primary Examiner.*

J. A. NARCAVAGE, *Assistant Examiner.*

U.S. Cl. X.R.

252—178, 188, 401